United States Patent [19]

Shaffer

[11] 4,185,043

[45] Jan. 22, 1980

[54] POLYMERS CONTAINING CHEMICALLY BONDED METAL ATOMS

[75] Inventor: Robert C. Shaffer, Playa del Ray, Calif.

[73] Assignee: Hitco, Irving, Calif.

[21] Appl. No.: 893,622

[22] Filed: Apr. 5, 1978

Related U.S. Application Data

[63] Continuation-in-part of Ser. No. 714,403, Aug. 16, 1976, Pat. No. 4,087,482.

[51] Int. Cl.$^2$ .................. C08L 63/00; C08G 83/00
[52] U.S. Cl. ..................... 525/364; 260/326.22; 525/361; 528/9; 528/112; 528/395
[58] Field of Search ............. 260/326.22, 830 R, 835; 528/9, 395

[56]         References Cited
        U.S. PATENT DOCUMENTS

| 3,370,026 | 2/1968 | Patella et al. ............ 260/17 R |
| 3,519,698 | 7/1970 | Baum .................... 260/850 |
| 3,544,530 | 12/1970 | Shaffer ................. 260/867 X |
| 3,563,848 | 2/1971 | Bhakuni et al. ........... 260/860 X |

OTHER PUBLICATIONS

Fowles et al., *Inorg. Chem.,* vol. 3, No. 2 (1964), pp. 257–259.

*Primary Examiner*—Walter C. Danison
*Attorney, Agent, or Firm*—Roylance, Abrams, Berdo & Farley

[57]          ABSTRACT

There are disclosed thermoplastic and thermosetting polymers which incorporate tungsten and/or molybdenum metal atoms. The metal atoms are incorporated into the polymer by reacting a monomer or polymer containing at least one free carboxyl group with a reaction product of tungsten or molybdenum and pyrrolidine.

5 Claims, No Drawings

4,185,043

POLYMERS CONTAINING CHEMICALLY BONDED METAL ATOMS

This application is a continuation-in-part of application Ser. No. 714,403, filed Aug. 16, 1976, now U.S. Pat. No. 4,087,482.

BACKGROUND OF THE INVENTION

This invention relates to thermoplastic and thermosetting polymers which incorporate metal atoms; and to novel intermediates for preparing such polymers.

The metal containing resins of this invention are useful in a wide variety of applications, e.g., in the fabrication of composites, castings, as reimpregnation and/or laminating resins, and other uses usually found for organic resin systems. The presence of the metal atom in the basic resin molecule makes possible the formulation of resin matrix systems which are capable of absorbing large amounts of energy for specific related applications. The metal containing resins of this invention may also be carbonized or graphitized as hereinafter discussed.

In preparing high temperature, corrosion and ablative resistant structures, it is the practice to impregnate refractory materials with a synthetic resin, shape the structure to the desired form, and thereafter finally cure the resin at the necessary elevated temperatures. Useful resins used heretofore for this purpose have included, for example, phenolic resins, epoxy resins and the like. With the advent of aerospace products, the requirements for materials having suitable ablative characteristics have become even more critical and, accordingly, the presence of carbonized products has found particularly acceptable application in this field. Thus, in preparing such products, resin impregnated refractory materials such as silica, carbon and graphite fibers and fabrics have been heated at high temperatures in order to reduce the impregnated resins substantially to carbon. The resulting products have improved high temperature characteristics due to the carbonized matrix materials present therein. The properties of the resins used to impregnate and coat the refractory fiber materials must be such that during the pyrolysis outgasing problems are minimized with a substantial amount of the original resin material being retained in the form of carbon matrix in the product structure. Thus, resin products, which upon carbonization undergo extensive volatilization, will not only yield a product in which a substantial amount of the pyrolyzing resin matrix has been driven off, but there is the additional danger that outgasing may occur at such a rate and in such a manner that the integrity of the refractory fibers or cloth composite may be impaired. In addition, where a substantial portion of the resin has been decomposed during the carbonization, a weakened structure may also result.

U.S. Pat. No. 3,544,530 discloses synthetic resins prepared by polymerizing furfuryl alcohol with an ester prepolymer of maleic acid or anhydride and a polyhydric alcohol. These copolymers, when pyrolyzed at high temperatures, retain a substantial amount of the original resin weight. Accordingly, these copolymers are valuable in preparing carbonized, high temperature, corrosion resistant and ablative products. The disclosure of this patent is incorporated herein by reference.

SUMMARY OF THE INVENTION

It has been discovered that the properties of thermoplastic and thermosetting polymers may be improved by incorporating therein at least one metal selected from the group consisting of tungsten and molybdenum. Thus, in accordance with the present invention, tungsten and/or molybdenum metal atoms are incorporated into the polymer chain of a thermoplastic or thermosetting polymer, which polymer contains at least one free carboxyl group. The presence of the metal atoms in the basic resin molecule makes possible the formulation of resin matrix systems which are capable of absorbing large amounts of energy for specific related applications. Depending on the specific formulation employed, these metal containing resins are useful for the fabrication of composites, castings, reimpregnation resins, and other uses usually found for synthetic resin systems.

In order to prepare the metal containing polymers of this invention, a complex is first prepared by reacting tungsten carbonyl or molybdenum carbonyl, with pyrrolidine. The reaction between the metal carbonyl and pyrrolidine may be accomplished in one of several methods found in the literature, e.g., an article by Fowles et al entitled "The Reactions of Group VI Metal Carbonyls with Pyrrolidine, Piperazine, and Morpholine", Inorganic Chemistry, Vol. 3, No. 2, February 1964, pages 257–259. The reaction product consisting of the pyrrolidine—metal carbonyl complex is ground to a fine powder for subsequent reaction.

The reaction product consisting of the pyrrolidine—metal carbonyl complex is believed to contain at least two moles of pyrrolidine to one mole of carbonyl. The complex is reactive with carboxyl groups, thereby allowing a wide selection of carboxyl containing monomers and polymers to react with said complex to form new classes of compounds.

In accordance with this invention, the pyrrolidine—metal carbonyl complex is reacted with a carboxylic acid. The carboxylic acid may be an ethylenically unsaturated monocarboxylic acid such as acrylic acid, methacrylic acid, 3,5-octadienoic acid, linolenic acid, eleostearic acid, arachidonic acid, linoleic acid, isaric acid, or other ethylenically unsaturated fatty acid. Since the complex is difunctional, two moles of a monocarboxylic acid react with one mole of the complex. The product obtained by reacting a monocarboxylic ethylenically unsaturated carboxylic acid with the complex may then be polymerized to form a homopolymer or copolymerized with other ethylenically unsaturated monomers, such as styrene, methyl acrylate, methyl methacrylate, ethyl acrylate, ethyl methacrylate, butyl acrylate, butyl methacrylate, acrylic acid, methacrylic acid, vinylacetate, vinylchloride, etc. Polymerization may be effected in accordance with procedures well known in the art, i.e., by using a free radical catalyst such as a peroxide (e.g., dicumyl peroxide, methylethylketone peroxide, benzoyl peroxide, di-t-butyl peroxide, and 2,5-dimethyl-2,5-di(t-butyl peroxy)hexane). A more detailed compilation of free radical initiators which may be used is set forth at pages II-3 to II-51 of "Polymer Handbook", Interscience Publishers (1966), the disclosure of which is incorporated herein by reference.

The carboxylic acid which is reacted with the pyrrolidine—metal carbonyl complex may also be either a saturated or an ethylenically unsaturated polycarboxylic acid. Examples of such acids include phthalic acid, phthalic anhydride, succinic acid, adipic acid, sebacic acid, isophthalic acid, terephthalic acid, maleic acid, maleic anhydride, fumaric acid, itaconic acid, etc. If one mole of dicarboxylic acid is reacted with the pyrrolidine—metal carbonyl complex, a thermoplastic polymer will be obtained; which thermoplastic polymer, if it contains ethylenic unsaturation due to at least a portion of the dicarboxylic acid being an ethylenically unsaturated dicarboxylic acid such as maleic acid, may be converted to a thermosetting polymer by reaction with a crosslinking agent, e.g., a vinyl monomer such as styrene. If two moles of dicarboxylic acid are reacted with one mole of the pyrrolidine—metal carbonyl complex, the reaction product will contain terminal carboxyl groups and this compound may be copolymerized with another material such as an epoxy resin or a glycol.

The carboxylic acid which is reacted with the pyrrolidine—metal carbonyl complex may also be a polyester prepolymer which contains free carboxyl groups. Such polyester prepolymers may be prepared by methods well known in the art by reacting a dicarboxylic acid or anhydride, such as one of those set forth in the preceding paragraph, with a polyhydroxy compound. Polyhydroxy compounds which may be utilized in preparing the prepolymers are polyols having the general formula:

R-(OH)$_n$ wherein n is an integer between 2 and 4 and wherein R is a hydrocarbon group containing between 2 and about 20 carbon atoms. Other suitable materials include polyoxyalkylene glycols or polyalkylene glycol ethers of the general formula:

HO (R'O)$_m$H wherein R' is an alkyl group of between about 2 and about 4 carbon atoms and wherein m is an integer of at least 2. Specific polyols which may be utilized include ethylene glycol, diethylene glycol, triethylene glycol, trimethylene glycol, tetraethylene glycol, 1,5-pentane diol, tetramethylene glycol (1,4-butylene glycol), 1,8-octane diol, glycerol, pentaerythritol, xylene glycol, polyoxyethylene glycol and polyoxypropylene glycol. Preferred mononuclear aromatic polyols are the polyhydric phenols such as hydroquinone, resorcinol and the like. The polyester prepolymers are preferably prepared by reacting at least a slight stoichiometric excess of the polycarboxylic acid with a polyhydric alcohol. Such polyester prepolymers are of relatively short chain length as compared to those wherein an excess of alcohol is used. The excess acid results in prepolymers characterized by fewer ester linkages and containing sufficient terminal acid groups to permit reaction of the polyester prepolymer with the reaction product of pyrrolidine and metal carbonyl. Such prepolymers have molecular weights typically in the range of from about 300 to about 1,000.

The carboxylic acid is reacted with the pyrrolidine—metal carbonyl reaction product by combining the two materials and heating the reaction mixture, preferably within the range of from about 100°–200° C. The amount of pyrrolidine—metal carbonyl reaction product which is reacted with the carboxylic acid may vary widely. Preferably from about 0.5 to 1 mole of pyrrolidine—metal carbonyl reaction product is reacted per mole of carboxylic acid.

DESCRIPTION OF THE PREFERRED EMBODIMENTS

The following four procedures illustrate the reaction of the metal carbonyl—pyrrolidine complex with a polycarboxylic acid and the subsequent crosslinking of the reaction product with a crosslinking agent such as styrene, polyalcohol, polyamine or furfuryl alcohol.

Procedure I

One mole of the metal carbonyl—pyrrolidine complex is blended with one to four moles of a maleic acid—diethylene glycol polyester prepolymer prepared as described in U.S. Pat. No. 3,544,530 and heated to about 110° C. for a period of approximately one hour. This product is further heated to about 160° C. for about another hour or until the desired product is formed. Four moles of a vinyl monomer crosslinking agent such as styrene are added and the mix is heated to 50° to 60° C. This product can then be gelled by further heating to 100° C. or gellation can be achieved by the addition of a catalyst such as methylethylketone peroxide. The amount of styrene used may be varied from one mole to eight or more moles per mole of metal complex to adjust the metal content to the desired proportion or to adjust the end product as to its physical properties.

Procedure II

Three moles of the metal carbonyl—pyrrolidine complex may be reacted with 3 to 12 moles of polyester prepolymer as described in Procedure I. The resultant product may be reacted with a polyalcohol, i.e., one containing more than two hydroxyl groups, at a temperature of from 100° C. to 200° C. until the desired product is formed. The polyalcohol could be any of the group which includes glycerol, 1,2,4-butane-triol, dipentaerythritol, meso-erythritol, pentaerythritol, or other common polyalcohol. It should be noted that the mole ratios will be different with different numbers of groups on each molecule.

Procedure III

Three moles of metal carbonyl—pyrrolidine reaction product may be reacted with 3 to 12 moles of maleic acid under the conditions described in Procedure I. The product may be reacted with a polyamine by heating until cured. The amines may include hexamethyldiamine, hexamethyltetraamine, triethylenetetraamine, methane diamine, diethylenetriamine, or other available polyamine. It is sometimes difficult to react an acid with an amine and salts of the acids may be used to facilitate the reaction.

Procedure IV

A polyester prepolymer containing metal atoms chemically linked in the polymer chain is prepared as described in Procedure I by reacting a metal carbonyl—pyrrolidine complex with a polyester prepolymer. This may then be reacted with furfuryl alcohol to form a thermosetting copolymer under the conditions described for reacting a polyester prepolymer with furfuryl alcohol in U.S. Pat. No. 3,544,530.

The following procedure illustrates the preparation of a thermosetting copolymer resin by reacting the metal carbonyl—pyrrolidine complex with a polycarboxylic acid and subsequently reacting this product with a copolymer such as an epoxy resin.

Procedure V

A polyester prepolymer containing metal atoms chemically bonded in the polymer chain is prepared as described in Procedure I. This product may then be blended with 1 to 5 or more moles of epoxy resin such as one obtained by the reaction of Bisphenol A and epichlorhydrin. The mixture is heated to about 100° C. to 150° C. until the desired product is formed.

The following two procedures illustrate the preparation of thermosetting resins by reacting the metal carbonyl—pyrrolidine complex with a monomeric dicarboxylic acid, subsequently reacting the product with a dihydric alcohol and then crosslinking the product with a tri- or tetrafunctional carboxylic acid or diisocyanate.

Procedure VI

One mole of metal carbonyl—pyrrolidine complex is reacted with 1 to 4 moles of an ethylenically unsaturated dicarboxylic acid, such as maleic acid, under the conditions described in Procedure I. This product is then reacted with about 1 mole of a dihydric alcohol, such as ethylene glycol, per mole of the dicarboxylic acid at a temperature between 100° C. and 200° C. until the necessary degree of reaction has occurred. This product is then reacted with a tri- or tetrafunctional carboxylic acid until the desired product is formed. The tri- or tetra-functional carboxylic acids or anhydrides which may be used include 1,2,4,5-benzenetricarboxylic acid, tetrahydrofuran-2,3,4,5-tetracarboxylic acid, 3,3',4,4'-benzophenonetetracarboxylic anhydride, 1,2,4-benzenetricarboxylic acid, cis,cis,cis,cis-1,2,3,4-cyclopentanecarboxylic acid, 1,4,5,8-naphthalenetetracarboxylic dianhydride, or other similar tri- or tetracarboxylic acids or their anhydrides.

Procedure VII

A reaction product of an ethylenically unsaturated dicarboxylic acid and the pyrrolidine—metal carbonyl complex, further reacted with a dihydric alcohol is prepared as described in Procedure VI, and the product is then reacted with a diisocyanate such as toluene diisocyanate until the desired product is formed.

The following procedure illustrates the preparation of a metal containing thermoplastic resin.

Procedure VIII

One mole of pyrrolidine—metal carbonyl complex is reacted with 2 moles of ethylenically unsaturated dicarboxylic acid, such as maleic acid, under the conditions described in Procedure I. The product is then reacted with 1 mole of dihydric alcohol such as ethylene glycol at between 100° C. and 200° C. until the desired product is formed.

The thermosetting resins of this invention may be cured under a wide variety of conditions. The specific curing times and temperatures will depend upon the desired physical state of the resin and the particular use or treatment of the product. Where the resins are to be used for impregnating fiber or fabrics or in laminating, an intermediate or partial curing is usually preferred; this partial cure is sometimes referred to as "B"-stage. B-stage temperatures of about 200° F. are suitable for this purpose and thereafter the staged composition may be stored at ambient temperatures, without the cure reaction proceeding to a point where the polymer becomes hard and unusable.

The metallic component of these resins is an integral part of the molecular structure of the resin and is therefore of atomic or near atomic size. Such resins, when pyrolyzed, show no evidence of metal loss via vaporization nor are metal agglomerates present. This is in contrast to resin compositions in which organo metallics have been mixed into the resin systems prior to cure—such systems result in relatively large metallic particles due to agglomeration or in loss of metallic content during the high firing temperatures necessary to convert the resin to carbon and/or graphite. Resin systems of this latter type which are converted to carbon or graphite are also vulnerable, in that the free metal particles melt when subjected to very high temperatures and/or under conditions of high energy absorption causing loss of composite integrity.

The resins of this invention which have been converted to carbon and/or graphite, although containing metal atoms as high as 45% by weight, show no evidence of melting at temperatures higher than the melting point of the basic metal or its carbides.

The metal containing polymers of this invention are valuable in preparing carbonized, high-temperature, corrosion resistant and ablative products under conditions known to those skilled in the art. Specifically, high silica fabric materials prepared by leaching glass fibers, as set forth in U.S. Pat. Nos. 2,491,761; 2,624,658; and 3,262,761 or carbonaceous fibers prepared by pyrolyzing cellulosic materials such as cotton, rayon and the like under controlled conditions, as disclosed, for example, in U.S. Pat. No. 3,294,489 may be impregnated with the metal containing resins of the present invention and thereafter pyrolyzed at temperatures of between about 800° and 5500° F. The resulting products retain a substantial and desirable amount of the original resin volume and weight, and yet are characterized by the improved ablative and temperature and corrosion resistant properties taken on as a result of the pyrolysis.

The impregnated fibrous material may be used to form molded articles, such as rocket engine nozzles and reentry materials, such as rocket nose cones. The presence of the metal atoms in the resin renders the material capable of absorbing large quantities of energy and also results in a higher density material which generally produces improved ablative properties.

The metal containing polymers of this invention may also be used to form films or coatings or may be cast. They may be used in combination with conventional adjuvants such as film forming prepolymers, fillers, etc. with which they are compatible. The metal containing polymers may also be cured and then carbonized and/or treated at graphitizing temperatures and the resultant material ground to provide particles which may be used as a filler in resins, elastomers, etc. to impart energy absorbing characteristics of the metal containing copolymers.

The following examples illustrate the best modes contemplated for carrying out this invention:

EXAMPLE 1

One mole equivalent of tungsten hexacarbonyl and an excess of pyrrolidine are reacted to form the metal pyrrolidine complex. At the completion of the reaction, the product is washed and ground to a fine powder.

A prepolymer is prepared by placing one mole equivalent of maleic anhydride in a reaction vessel, raising the temperature to 130° C. and adding 0.83 mole equivalent of ethylene glycol with thorough mixing while maintaining the temperature. The reaction is continued at 130° C. until a liquid prepolymer is obtained. This prepolymer is then cooled to ambient temperature. A portion of the prepolymer thus obtained is thoroughly mixed with the tungsten hexa carbonyl pyrrolidine reaction product in the ratio of 10 parts by weight of prepolymer to 15 parts by weight of the tungsten hexa carbonyl pyrrolidine reaction product. This mixture is then heated to a maximum temperature of 205° C. From this reaction, a highly viscous, dark, thermoplastic polyester containing tungsten atoms chemically bonded in the polymer chain is obtained.

EXAMPLE 2

The polyester obtained in Example 1 is blended with 8 parts by weight of furfuryl alcohol and the mixture is heated to between 100° and 200° C. The reaction is maintained at this temperature range until the desired viscosity has been achieved at which point heating is discontinued and the reaction product rapidly cooled. The resultant thermosetting polymer is a highly viscous dark liquid which is soluble in certain organic solvents. The polymer obtained is then diluted and used to impregnate graphite fabric. Thereafter, the resin-fiber composition can be moulded under heat and pressure to form an insoluble and infusible mass.

EXAMPLE 3

The procedure of Example 1 is repeated except that the polyester is prepared by reacting two mole equivalents of maleic anhydride with one mole equivalent of ethylene glycol.

EXAMPLE 4

A polyester is prepared by mixing one mole equivalent of maleic anhydride heated to 130° C. with 0.5 mole equivalent of ethylene glycol and thoroughly mixing while maintaining the temperature at 130° C. until a viscous liquid is obtained. The polymer thus obtained is mixed with the reaction product of tungsten hexacarbonyl and pyrrolidine obtained as described in Example 1 in the ratio of 30 parts by weight of prepolymer to 15 parts by weight of tungsten hexacarbonyl pyrrolidine reaction product. The process of Example 1 is then followed to obtain a highly viscous tungsten containing thermoplastic polymer.

EXAMPLE 5

The polymer obtained in Example 4 is blended with 15 parts by weight of furfuryl alcohol and the mixture is heated to between 100° and 200° C. The reaction is maintained in this temperature range until the desired viscosity is reached. At this point, heating is discontinued and the reaction product is rapidly cooled. The resultant thermosetting polymer is a highly viscous dark liquid which is stable when stored at 25° C. and which thereafter can be cured at higher temperatures to form a black infusible solid matrix.

EXAMPLE 6

One mole equivalent of molybdenum hexacarbonyl and an excess of pyrrolidine is reacted to form the metal pyrrolidine complex. At the completion of the reaction, the product is washed and ground to a powder.

A polyester is prepared by mixing one mole equivalent of maleic anhydride heated to a temperature of 130° C. with one mole equivalent of ethylene glycol and thoroughly mixing while maintaining the temperature at 130° C. The reaction is continued at 130° C. for approximately four hours until a viscous prepolymer is obtained. This prepolymer is then cooled to ambient temperature. A portion of the prepolymer thus obtained is thoroughly mixed with the molybdenum hexa carbonyl pyrrolidine reaction product in a ratio of 30 parts by weight of prepolymer to 15 parts by weight of the molybdenum hexa carbonyl pyrrolidine reaction product. This mixture is then heated to a maximum temperature of 205° C. From this reaction, a highly viscous, thermoplastic molybdenum containing dark polymer is obtained.

EXAMPLE 7

The polymer obtained in Example 6 is blended with 15 parts by weight of furfuryl alcohol per 39 parts of polymer and the mixture heated to between 100° and 200° C. The reaction is maintained at this temperature for approximately four hours until the desired viscosity has been achieved at which point heating is discontinued and the reaction product rapidly cooled. The resultant metal containing thermosetting polymer is a highly viscous dark liquid, soluble in certain organic solvents. The polymer is stable when stored at 25° C. and can thereafter be cured at higher temperatures, e.g., 210° C., to form a black, infusible solid matrix.

EXAMPLE 8

One mole of the metal carbonyl-pyrrolidine complex (438 grams) is blended with two moles of the maleic acid-diethylene glycol prepolymer (604 grams) prepared as described in U.S. Pat. No. 3,544,530, and heated to about 110° C. for a period of approximately one hour. This product is further heated to about 160° C. for another hour or until the desired product is formed. Four moles of styrene (416 grams) are added and this blend is then heated to 50° C. until the product is cured or advanced to the desired state. If so desired, lower temperature cures may be obtained by the use of a catalyst such as methylethyl-ketone peroxide. The product may be used where a metal containing char is needed with a high proportion of metal to carbon.

EXAMPLE 9

Three moles of the metal carbonyl-pyrrolidine complex (1314 grams) is blended with six moles of the maleic acid-diethylene glycol prepolymer (1812 grams) prepared as described in U.S. Pat. No. 3,544,530 and heated to about 110° C. for a period of approximately one hour. This product is further heated to about 160° C. for another hour or until the desired product is formed. Two and one-fourth moles of glycerol (207 grams) is added and this blend is heated to 150° C. to 200° C. for six to eight hours until cured or the desired product is formed. The product may be used as a baking finish paint to stop an X-ray.

EXAMPLE 10

Three moles of metal carbonyl-pyrrolidine complex (1314 grams) may be reacted with six moles of maleic acid (696 grams) as in Example 8. This product may then be blended with a polyamine such as two moles of triethylenetetraamine (292 grams) and cured by heating to 50° C. The product before curing is useful as a low temperature cure casting and is also useful in the synthesis of high molecular weight, long chain polymers having high tensile strength.

EXAMPLE 11

One mole of metal carbonyl-pyrrolidine complex (438 grams) is reacted with two moles of maleic acid (232 grams) as described in Example 8. This product is blended with two moles of epoxy resin (760 grams) such as the one obtained by the reaction of Bisphenol A and epichlorhydrin. This product may be cured at a temperature above 110° F. This product is useful as a base for an adhesive containing metal atoms which would impart energy absorbing properties to these materials.

EXAMPLE 12

One mole of metal carbonyl-pyrrolidine complex (438 grams) is reacted with two moles of maleic acid (232 grams) as described in Example 8. This product is then blended with two moles of ethylene glycol (124 grams) and heated to 150° C. for a period of 6 hours. This product is then further reacted with three-fourth mole of pyromellitic dianhydride (164 grams) at 200° C. until cured or until the desired product is formed. This product is useful as a base for baking finishes and for special laminating resins.

EXAMPLE 13

One mole of the metal carbonyl-pyrrolidine complex (438 grams) is reacted with two moles of maleic acid (232 grams) as described in Example 8. The product is then reacted with two moles of ethylene glycol (124 grams) at 150° C. for a period of six hours. This product is then further reacted with one mole of tolylene diisocyanate (174 grams) at approximately 175° C. until cured or until the desired product is formed. This resin is useful in foams, rubbers or fibers, which would be capable of energy absorption for special applications.

EXAMPLE 14

One mole of metal carbonyl-pyrrolidine complex (438 grams) is reacted with two moles of maleic anhydride-diethylene glycol prepolymer (604 grams) as described in Example 8. This product is then reacted with one mole of diethylene glycol (106 grams) at 150° C. to 200° C. for a period of five or more hours until the desired product is formed. The resulting resin is useful where a high chain length and high temperature flexibility is needed.

I claim:

1. A thermosetting polymer obtained by reacting an epoxy resin with the reaction product of either a saturated or an ethylenically unsaturated dicarboxylic acid and a metal complex which is a reaction product of tungsten carbonyl and/or molybdenum carbonyl with pyrrolidine.

2. A thermosetting polymer as defined in claim 1 wherein said dicarboxylic acid is an ethylenically unsaturated dicarboxylic acid.

3. A thermosetting polymer as defined in claim 2 wherein said epoxy resin is obtained by the reaction of Bisphenol A and epichlorohydin.

4. A thermosetting polymer obtained by reacting an epoxy resin with a thermoplastic polymer containing tungsten and/or molybdenum metal atoms chemically bonded in the polymer chain, said thermoplastic polymer comprising the reaction product of (1) a metal complex which is a reaction product of tungsten carbonyl and/or molybdenum carbonyl with pyrrolidine and (2) a condensation product of a dicarboxylic acid or anhydride and a polyhydric alcohol.

5. A thermosetting polymer as defined in claim 4 wherein said epoxy resin is obtained by the reaction of Bisphenol A and epichlorohydrin.

* * * * *